(12) United States Patent
Sakuda et al.

(10) Patent No.: US 9,115,483 B2
(45) Date of Patent: Aug. 25, 2015

(54) HYDRAULIC EXCAVATOR AND METHOD FOR MEASURING STROKE OF HYDRAULIC CYLINDER OF HYDRAULIC EXCAVATOR

(71) Applicant: KOMATSU LTD., Tokyo (JP)

(72) Inventors: Yukihiro Sakuda, Hirakata (JP); Satoru Shintani, Hirakata (JP); Masato Kageyama, Oyama (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/342,683

(22) PCT Filed: Feb. 27, 2013

(86) PCT No.: PCT/JP2013/055095
§ 371 (c)(1),
(2) Date: Mar. 4, 2014

(87) PCT Pub. No.: WO2014/112129
PCT Pub. Date: Jul. 24, 2014

(65) Prior Publication Data
US 2015/0066312 A1 Mar. 5, 2015

(30) Foreign Application Priority Data
Jan. 18, 2013 (JP) .................. 2013-007497

(51) Int. Cl.
*G06F 7/70* (2006.01)
*E02F 9/26* (2006.01)
(Continued)

(52) U.S. Cl.
CPC ................. *E02F 9/264* (2013.01); *E02F 3/425* (2013.01); *E02F 3/435* (2013.01); *E02F 9/2271* (2013.01);
(Continued)

(58) Field of Classification Search
CPC .......... E02F 9/264; E02F 3/435; E02F 3/425; E02F 9/2271; G01D 5/264; F15B 15/28; G01B 7/00

USPC ............................................ 180/273; 701/50
See application file for complete search history.

(56) References Cited

U.S. PATENT DOCUMENTS 5,131,393 A   7/1992   Ishiguro et al.
5,627,467 A   5/1997   Lee et al.
(Continued)

FOREIGN PATENT DOCUMENTS

CN    1201118 A      12/1998
JP    H01-174295 A    7/1989
(Continued)

OTHER PUBLICATIONS

Wikipedia's Page on rotary encoders. Snapshot taken Feb. 7, 2010 with Wayback Machine.*

*Primary Examiner* — John Q Nguyen
*Assistant Examiner* — Jordan S Fei
(74) *Attorney, Agent, or Firm* — Drinker Biddle & Reath LLP

(57) ABSTRACT

A hydraulic excavator includes a base body portion, a movable portion, a hydraulic cylinder, a position sensor, a rotary encoder, and a control unit. The rotary encoder includes a light emitting unit, a light receiving unit, and a disk unit having a plurality of transmission portions. The control unit measures the stroke length of the hydraulic cylinder by correcting deviation of the stroke length, which is measured by the position sensor, based on the pulse signal output from the rotary encoder. In this way, there can be obtained a hydraulic excavator capable of precisely measuring a stroke length of a hydraulic cylinder driving a work implement, as well as a method for measuring the stroke of the hydraulic cylinder of the hydraulic excavator.

10 Claims, 9 Drawing Sheets

(51) Int. Cl.
*G01B 7/00* (2006.01)
*G01B 7/30* (2006.01)
*E02F 9/22* (2006.01)
*F15B 15/28* (2006.01)
*E02F 3/42* (2006.01)
*E02F 3/43* (2006.01)
*G01D 5/26* (2006.01)
*G01M 13/00* (2006.01)
*G01M 17/00* (2006.01)

(52) U.S. Cl.
CPC . *F15B 15/28* (2013.01); *G01B 7/00* (2013.01); *G01B 7/30* (2013.01); *G01D 5/264* (2013.01); *G01M 13/00* (2013.01); *G01M 17/00* (2013.01)

(56) References Cited

U.S. PATENT DOCUMENTS

| | | |
|---|---|---|
| 6,005,395 A | 12/1999 | Chan et al. |
| 2005/0212513 A1* | 9/2005 | Yamashita et al. ....... 324/207.25 |
| 2009/0167214 A1 | 7/2009 | Masuo et al. |

FOREIGN PATENT DOCUMENTS

| | | |
|---|---|---|
| JP | H04-54947 A | 2/1992 |
| JP | H04-345516 A | 12/1992 |
| JP | H05-75603 U | 10/1993 |
| JP | H06-66597 A | 3/1994 |
| JP | H06-336751 A | 12/1994 |
| JP | H08-233570 A | 9/1996 |
| JP | H10-2706 A | 1/1998 |
| JP | H11-304406 A | 11/1999 |
| JP | 2000-110191 A | 4/2000 |
| JP | 2000-240604 A | 9/2000 |
| JP | 2005-233687 A | 9/2005 |
| JP | 2006-194766 A | 7/2006 |
| JP | 2006-226909 A | 8/2006 |
| JP | 2006-258730 A | 9/2006 |
| JP | 2009-165204 A | 7/2009 |
| JP | 2012-255709 A | 12/2012 |
| JP | 2013-007175 A | 1/2013 |
| WO | WO-2012/169531 A1 | 12/2012 |

* cited by examiner

HYDRAULIC EXCAVATOR AND METHOD FOR MEASURING STROKE OF HYDRAULIC CYLINDER OF HYDRAULIC EXCAVATOR

TECHNICAL FIELD

The present invention relates to a hydraulic excavator and a method for measuring a stroke of a hydraulic cylinder of the hydraulic excavator.

BACKGROUND ART

A hydraulic excavator, which is one of work machines, includes: a carrier; an upper revolving unit disposed on the carrier and capable of revolving; and a work implement disposed on the upper revolving unit. The work implement includes: a boom having one end pivotably supported on a base body portion; an arm having one end pivotably supported on the other end of the boom; and an attachment pivotably supported on the other end of the arm. The boom, the arm, and the attachment are driven by hydraulic cylinders. In order to detect the position and posture of this work implement, a stroke of each hydraulic cylinder is measured.

For example, Japanese Patent Laying-Open No. 2006-258730 (Patent Document 1) discloses a hydraulic excavator including a position sensor that detects a piston stroke position of a hydraulic cylinder, which drives a work implement, by means of rotation of a rotary roller on a cylinder rod thereof. Slight slippage between the rotary roller and the cylinder rod introduces an error between an actual stroke position and a stroke position obtained from a result of detection of the position sensor. In order to calibrate the stroke position obtained from the result of detection of the position sensor in accordance with a reference position, a magnetic force sensor serving as a reset sensor is provided at the reference position on the external surface of the cylinder tube of the hydraulic cylinder. Whenever the piston passes through the reference position during work, a stroke position detected by the position sensor is calibrated, thereby attaining precise position measurement.

CITATION LIST

Patent Document

PTD 1: Japanese Patent Laying-Open No. 2006-258730

SUMMARY OF INVENTION

Technical Problem

The magnetic force sensor described in the foregoing patent publication permits passage of lines of magnetic force generated by a magnet provided in the piston connected to the cylinder rod, detects magnetic force (flux density), and outputs an electric signal (voltage) corresponding to the magnetic force (flux density). However, this magnetic force sensor detects a stroke position at a peak of the voltage, but the peak position of the voltage may not be detected precisely when the cylinder rod is moved at a high speed. In this case, the stroke position obtained from the result of detection of the position sensor cannot be precisely calibrated in accordance with the reference position, with the result that deviation of stroke length cannot be precisely corrected, disadvantageously.

Meanwhile, hydraulic oil for the hydraulic cylinder driving the work implement often has an oil temperature of nearly 100° C. during work. Such an oil temperature leads to expansion of the cylinder tube having the reset sensor installed thereon. Accordingly, the installation position of the reset sensor is changed to result in a measurement error. In order to avoid influence of the expansion, it is desirable to install the reset sensor at or near a retraction-side stroke end of the piston.

However, in the hydraulic excavator, the work implement is movable in a very wide range, so that the piston is rarely moved to the stroke end during the actual work. Accordingly, the reset sensor installed at the stroke end performs calibration less frequently during work, thus failing effective calibration. In order to perform calibration more frequently, a reset sensor needs to be installed in a middle of the piston stroke range. However, in this range, the thermal expansion causes displacement of the installation position of the reset sensor, resulting in large measurement error. Moreover, the piston is operated at the highest speed in this range, so that the measurement error becomes large due to the moving speed of the cylinder rod.

The present invention has been made in view of the foregoing problem, and has an object to provide a hydraulic excavator capable of precisely measuring a stroke length of a hydraulic cylinder driving a work implement, as well as a method for measuring the stroke of the hydraulic cylinder of the hydraulic excavator.

Solution to Problem

A hydraulic excavator of the present invention includes a base body portion, a movable portion, a hydraulic cylinder, a position sensor, a rotary encoder, and a control unit. The base body portion is formed of one of a vehicle main body and a boom. The movable portion is supported to be revolvable relative to the base body portion. The hydraulic cylinder supports the movable portion such that the movable portion is revolvable relative to the base body portion. The position sensor is installed on the hydraulic cylinder to measure a stroke length of the hydraulic cylinder. The rotary encoder is installed across the base body portion and the movable portion, the rotary encoder including a light emitting unit, a light receiving unit capable of receiving light emitted from the light emitting unit, and a disk unit having a plurality of transmission portions that permit passage of the light emitted from the light emitting unit to the light receiving unit. The disk unit is revolved in synchronization with revolution of the movable portion relative to the base body portion. The light receiving unit outputs, based on the light having passed through the plurality of transmission portions, a pulse signal generated according to an angle of revolution of the disk unit. The angle of revolution of the disk unit is associated with an angle of revolution of the movable portion. The control unit measures the stroke length of the hydraulic cylinder by correcting deviation of the stroke length, which is measured by the position sensor, based on the pulse signal output from the rotary encoder.

According to the hydraulic excavator of the present invention, the control unit corrects the deviation of the stroke length, measured by the position sensor, based on the pulse signal output from the rotary encoder. The pulse signal can be detected precisely, so that the deviation of the stroke length measured by the position sensor can be corrected precisely and the stroke length of the hydraulic cylinder can be measured by correcting the deviation of the stroke length based on the pulse signal output from the rotary encoder.

In the hydraulic excavator, as the pulse signal, the rotary encoder outputs a pulse signal having A phase, outputs a pulse signal having B phase different from the pulse signal having A phase by 90° in phase, and outputs a pulse signal having Z phase at a reference position other than a stroke end of the hydraulic cylinder. The hydraulic cylinder is less likely to reach the stroke end of the hydraulic cylinder during work. Hence, with the reference position being a position other than the stroke end of the hydraulic cylinder, the stroke length can be precisely measured during work.

In the hydraulic excavator, the hydraulic cylinder includes a cylinder tube, and a cylinder rod movable relative to the cylinder tube within the cylinder tube. The rotary encoder outputs the pulse signal having Z phase at the reference position within a range from a side of one end, which is external to the cylinder tube, of the cylinder rod relative to an extension-side stroke end position of the cylinder rod to a side of an other end, which is within the cylinder tube, of the cylinder rod relative to a retraction-side stroke end position of the cylinder rod. With the reference position being set in the range, the stroke position can be reset in accordance with the reference position during work. In this way, the deviation of the stroke length can be precisely corrected during work.

In the hydraulic excavator, the control unit stores a reference stroke length corresponding to an integer number of pulses of the pulse signal having A phase after outputting the pulse signal having Z phase. In accordance with the reference stroke length, the control unit corrects the deviation of the stroke length measured by the position sensor corresponding to the integer number of pulses of the pulse signal having A phase. In this way, the deviation of the stroke length can be corrected in comparison between the reference stroke length and the stroke length measured by the position sensor. Both the reference stroke length and the stroke length measured by the position sensor correspond to the same integer number of pulses of the pulse signal having A phase. The use of the integer number of pulses of the pulse signal having A phase leads to suppression of influence of an error between the reference stroke length and the measured stroke length per pulse of the pulse signal having A phase.

In the hydraulic excavator, a direction of revolution of the disk unit during measurement of the reference stroke length is the same as a direction of revolution of the disk unit during measurement of the stroke length. This can eliminate an error resulting from a difference in direction of revolution of the disk unit, whereby more precise correction can be performed.

The hydraulic excavator further includes: a first lever connected to the rotary encoder installed on the base body portion; a second lever connected to the movable portion; and a ball joint revolvably connected to the first lever and the second lever. This can reduce propagation of load and vibrations from the movable portion to the rotary encoder installed on the base body portion.

A method for measuring a stroke of a hydraulic cylinder of a hydraulic excavator in the present invention includes the following steps. There is measured a stroke length of the hydraulic cylinder supporting a movable portion such that the movable portion is revolvable relative to a base body portion formed of one of a vehicle main body and a boom. A signal is output which is associated with an angle of revolution of the movable portion relative to the base body portion. The stroke length of the hydraulic cylinder is measured by correcting deviation of the measured stroke length based on the signal. In this way, the deviation of the measured stroke length can be corrected based on the signal associated with the angle of revolution of the movable portion relative to the base body portion and the stroke length of the hydraulic cylinder can be measured.

The method for measuring the stroke of the hydraulic cylinder of the hydraulic excavator includes the following steps. In the step of measuring the stroke length of the hydraulic cylinder, the stroke length of the hydraulic cylinder is measured by a rotation sensor as an amount of rotation. In the step of outputting the signal, a pulse signal is formed and output, which is generated according to an angle of revolution, associated with the stroke length of the hydraulic cylinder, of a disk unit that is provided with a plurality of transmission portions allowing light emitted from a light emitting unit to pass therethrough to a light receiving unit and that is revolved in synchronization with revolution of the movable portion relative to the base body portion, by the light receiving unit from a rotary encoder based on the light having passed through the plurality of transmission portions. In the step of measuring the stroke length of the hydraulic cylinder, deviation of the stroke length, which is measured by the rotation sensor, is corrected by a control unit based on the pulse signal output from the rotary encoder. The pulse signal can be detected precisely, so that the deviation of the stroke length measured by the position sensor can be corrected precisely and the stroke length of the hydraulic cylinder can be measured by correcting the deviation of the stroke length based on the pulse signal output from the rotary encoder.

The method for measuring the stroke of the hydraulic cylinder of the hydraulic excavator in the present invention includes the following step. In the step of correcting by the control unit, the deviation of the stroke length, which is measured by the rotation sensor, is corrected based on the pulse signal output from the rotary encoder, while the hydraulic cylinder is non-operational. By correcting the deviation of the stroke length while the hydraulic cylinder is non-operational, the stroke length can be measured precisely. Hence, the stroke length can be corrected precisely.

The method for measuring the stroke of the hydraulic cylinder of the hydraulic excavator in the present invention includes the following step. In the step of correcting by the control unit, in accordance with a reference stroke length corresponding to an integer number of pulses of the pulse signal from a reference position, the deviation of the stroke length, which is measured by the position sensor and which corresponds to the integer number of pulses of the pulse signal, is corrected. In this way, calibration can be performed always at the same stroke position. As a result, precision in calibration, i.e., precision in measurement is improved.

The method for measuring the stroke of the hydraulic cylinder of the hydraulic excavator in the present invention includes the following step. A direction of motion of a cylinder rod of the hydraulic cylinder relative to a cylinder tube during measurement of the reference stroke length is the same as a direction of motion of the cylinder rod of the hydraulic cylinder relative to the cylinder tube during measurement of the stroke length. Accordingly, the deviation of the stroke length is corrected with the cylinder rod being moved relative to the cylinder tube in the same direction. Hence, the deviation of the stroke length due to slippage of the position sensor can be eliminated. The slippage takes place when the directions of motion of the cylinder rod relative to the cylinder tube differ.

Advantageous Effects of Invention

As described above, according to the present invention, the deviation of the stroke length can be precisely corrected, whereby the stroke length of the hydraulic cylinder of the work implement of the hydraulic excavator can be precisely measured.

DESCRIPTION OF EMBODIMENTS

The following describes an embodiment of the present invention based on figures.

Described first is a configuration of a work machine in one embodiment of the present invention. In the description below, a hydraulic excavator is illustrated as one exemplary work machine to which a concept of the present invention can be applied.

Figure 1:
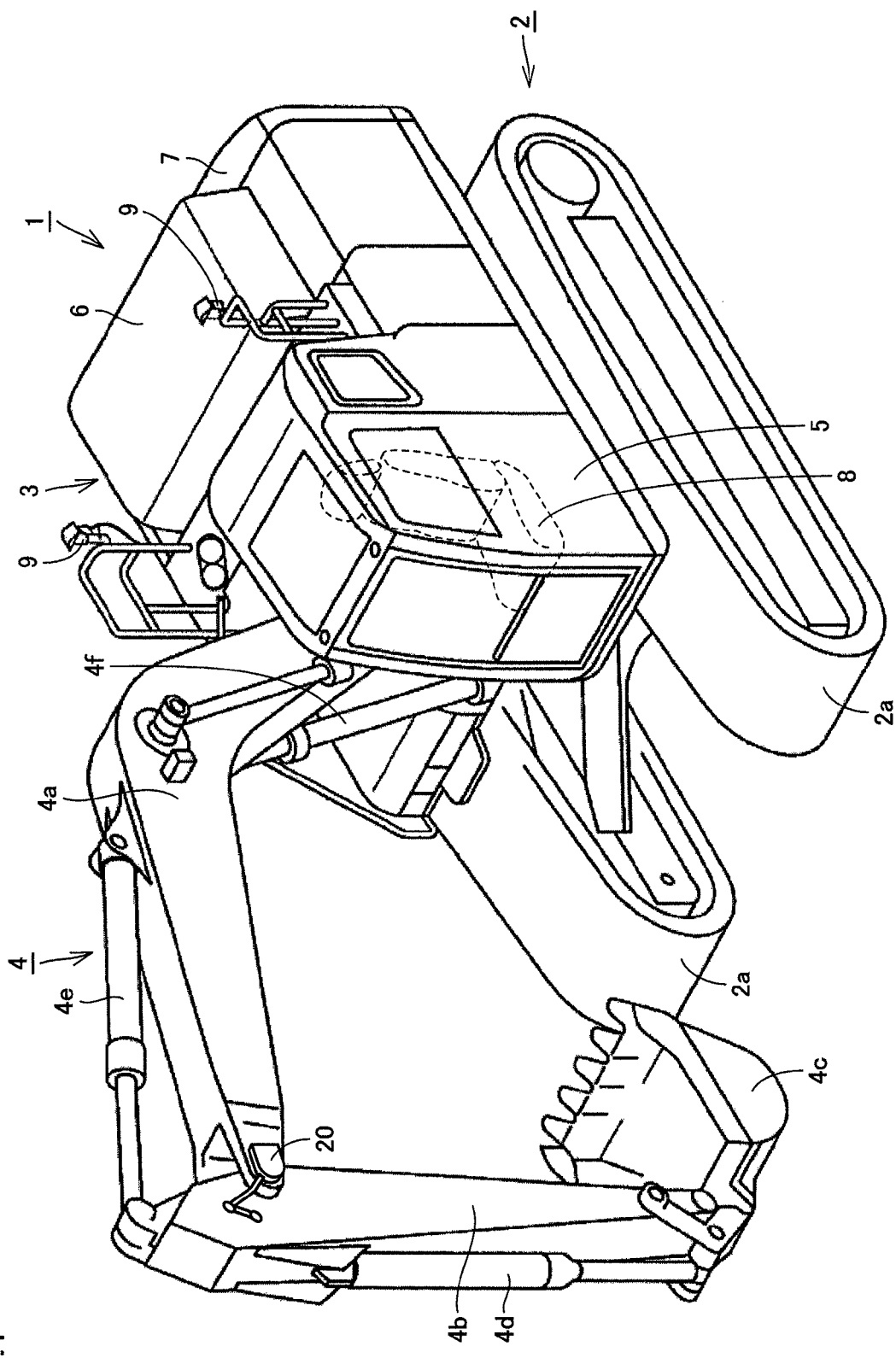
FIG. 1 is a perspective view schematically showing a configuration of a hydraulic excavator in one embodiment of the present invention.

Referring to FIG. 1, hydraulic excavator 1 mainly includes a lower carrier 2, an upper revolving unit 3, and a work implement 4. Lower carrier 2 is configured to be capable of traveling autonomously by rotation driving of a pair of left and right crawler belts 2a. Upper revolving unit 3 is installed rotatable about lower carrier 2. Work implement 4 is pivotably arranged at the front side of upper revolving unit 3 to move up and down. Work implement 4 includes a boom 4a, an arm 4b, a bucket 4c serving as an exemplary attachment, hydraulic cylinders (a bucket cylinder 4d, an arm cylinder 4e, and a boom cylinder 4f), and the like.

Lower carrier 2 and upper revolving unit 3 mainly form the work vehicle main body. Upper revolving unit 3 includes a cab 5 at the front left side (vehicle front side), and includes an engine compartment 6 and a counter weight 7 at the rear side (vehicle rear side). Engine compartment 6 contains an engine therein. In cab 5, an operator's seat 8 on which an operator sits is disposed. Further, an antenna 9 is installed on the upper surface of upper revolving unit 3. It should be noted that in the present embodiment, the front, rear, left, and right sides of the vehicle are defined on the basis of the operator who sits on operator's seat 8 in cab 5.

Further, a rotary encoder 20 is installed on boom 4a. Another rotary encoder 20 is also installed on the vehicle main body as described below. Revolution of arm 4b relative to boom 4a is transmitted to rotary encoder 20 installed on boom 4a via a lever pivotably arranged at arm 4b. Rotary encoder 20 outputs a pulse signal corresponding to an angle of revolution thereof. Revolution of boom 4a relative to vehicle main body 1a is transmitted to rotary encoder 20 installed on vehicle main body 1a via a lever pivotably arranged at boom 4a. Rotary encoder 20 outputs a pulse signal corresponding to an angle of revolution thereof.

Figure 2:
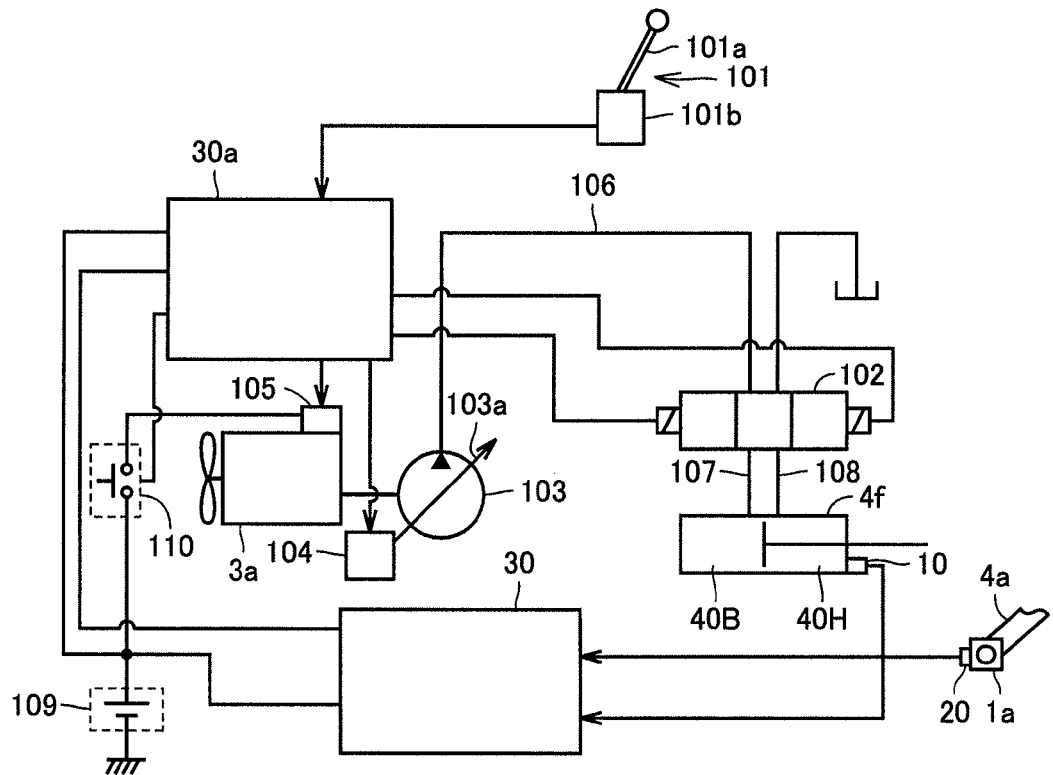
FIG. 2 schematically shows a hydraulic circuit of the hydraulic excavator in one embodiment of the present invention.

Referring to FIG. 1 and FIG. 2, a hydraulic circuit of the hydraulic excavator will be described.

FIG. 2 shows a configuration in which an electric signal is supplied from an electric type operation lever device 101 to an operation controller 30a and a control electric signal is supplied from operation controller 30a to a control valve 102 for hydraulic cylinder (boom cylinder) 4f so as to drive boom cylinder 4f.

Boom cylinder 4f, arm cylinder 4e, and bucket cylinder 4d respectively corresponding to boom 4a, arm 4b, and bucket 4c provided in work implement 4 are driven to operate boom 4a, arm 4b, and bucket 4c. It should be noted that in actual hydraulic excavator 1, the hydraulic cylinders are respectively provided for boom 4a, arm 4b, and bucket 4c, but for ease of description, boom cylinder 4f is only illustrated and the other cylinders are not illustrated in FIG. 2.

Boom cylinder 4f is driven using a variable capacity type hydraulic pump 103 as a driving source, for example. Hydraulic pump 103 is driven by engine 3a. Hydraulic pump 103 has a swash plate 103a driven by a servo mechanism 104. Servo mechanism 104 operates in accordance with a control signal (electric signal) output from operation controller 30a so as to change the position of swash plate 103a of hydraulic pump 103 to a position corresponding to the control signal. Further, an engine driving mechanism 105 of engine 3a operates in accordance with a control signal (electric signal) output from operation controller 30a so as to rotate engine 3a at a rotation speed corresponding to the control signal.

Hydraulic pump 103 has a discharging outlet communicating with control valve 102 via a discharging oil path 106. Control valve 102 communicates with oil chambers 40B, 40H of boom cylinder 4f via oil paths 107, 108. The hydraulic oil discharged from hydraulic pump 103 is supplied to control valve 102 via discharging oil path 106. The hydraulic oil having passed through control valve 102 is supplied to an oil chamber 40B or an oil chamber 40H of boom cylinder 4f via an oil path 107 or 108.

On boom cylinder 4f, a position sensor 10 is installed. Position sensor 10 is a stroke sensor that measures a stroke of the piston. Rotary encoder 20 is installed in vehicle main body 1a at its portion that pivotably supports boom 4a. Rotary encoder 20 detects an angle of revolution of boom 4a, and outputs a pulse signal in accordance with the angle of revolution. Both position sensor 10 and rotary encoder 20 are connected to a measurement controller 30.

A battery 109 is a power source for operating measurement controller 30 and operation controller 30a. Measurement controller 30 is electrically connected to battery 109. Operation controller 30a is electrically connected to battery 109 via an ignition key switch 110.

When ignition key switch 110 is turned on, battery 109 is electrically connected to a starting motor (not shown) for engine 3a so as to start engine 3a and battery 109 is electrically connected to operation controller 30a so as to operate operation controller 30a. When ignition key switch 110 is turned off, the electric connection between operation controller 30a and battery 109 is disconnected to stop engine 3a and stop operation of operation controller 30a.

Measurement controller 30 receives a switching state signal indicating a switching state (ON/OFF) of ignition key switch 110. When the switching state signal received by measurement controller 30 is ON, measurement controller 30 is brought into an operational state. When the switching state signal becomes OFF, measurement controller 30 is brought into a non-operational state.

Operation lever device 101 includes: an operation lever 101a provided in cab 5; and a detecting unit 101b that detects an operation signal indicating direction and amount of operation of operation lever 101a, for example. The operation signal detected by detecting unit 101b is sent to operation controller 30a. Control valve 102 is connected to operation controller 30a via an electric signal line.

When operation lever 101a is operated, an operation signal of operation lever 101a is sent to operation controller 30a, which then generates a control signal for operating control valve 102. The control signal is supplied from operation controller 30a to control valve 102 via the electric signal line, thus changing the valve position of control valve 102.

Figure 3:
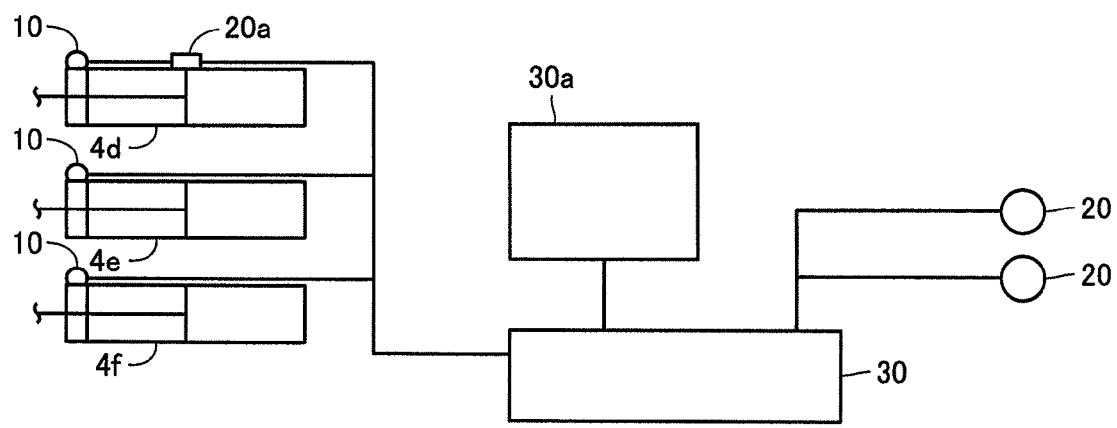
FIG. 3 schematically shows a relation among a hydraulic cylinder, a position sensor, a rotary encoder, and a measurement controller of the hydraulic excavator in one embodiment of the present invention.

Referring to FIG. 3, the following describes the hydraulic cylinders (bucket cylinder 4d, arm cylinder 4e, and boom cylinder 4f), measurement controller 30, and operation controller 30a.

On each of arm cylinder 4e and boom cylinder 4f, position sensor 10 is installed to detect a stroke amount of the hydraulic cylinder as an amount of rotation. On bucket cylinder 4d, position sensor 10 and a magnetic force sensor 20a are installed.

Rotary encoders 20 are respectively installed on boom 4a, and vehicle main body 1a at its portion supporting the rotating shaft for arm 4b and boom 4a. Rotary encoders 20 output pulse signals in accordance with amounts of revolution (angles) of arm 4b and boom 4a. Each of the pulse signals is of rectangular wave.

Position sensors 10, rotary encoders 20, and magnetic force sensor 20a are electrically connected to measurement controller 30. Based on the detection signals of position sensors 10, rotary encoders 20, and magnetic force sensor 20a, measurement controller 30 measures respective stroke lengths of bucket cylinder 4d, arm cylinder 4e, and boom cylinder 4f. Also based on the measured strokes of the cylinders, measurement controller 30 calculates position and posture of bucket 4c.

Figure 4:
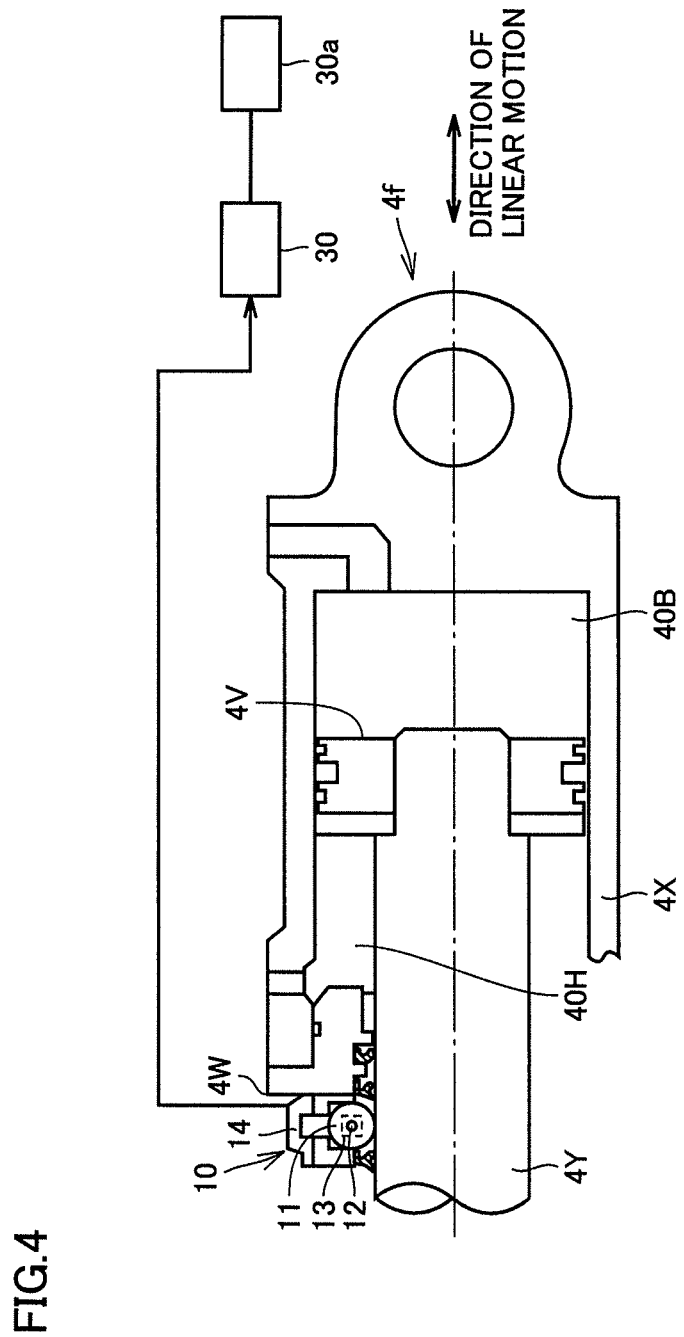
FIG. 4 schematically shows a relation between the hydraulic cylinder and the position sensor in the hydraulic excavator in one embodiment of the present invention.
Figure 5:
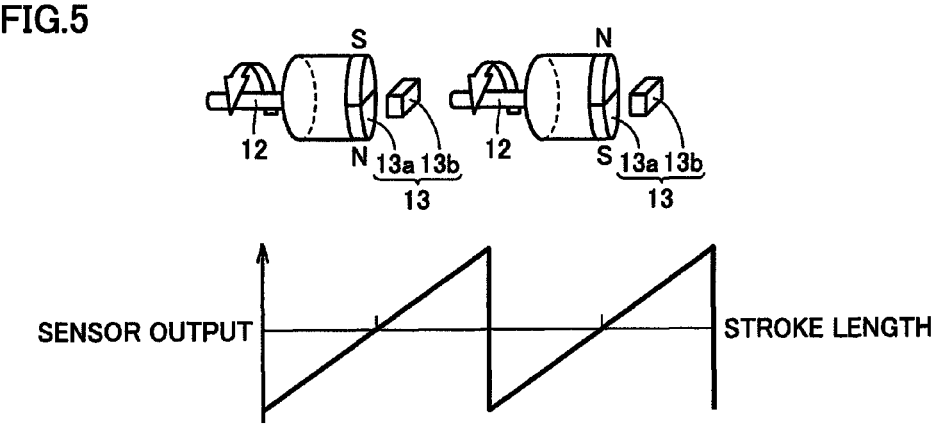
FIG. 5 schematically shows the position sensor of the hydraulic excavator in one embodiment of the present invention.

Referring to FIG. 4 and FIG. 5, position sensors 10 will be described. For ease of description, position sensor 10 installed on boom cylinder 4f will be described, but similar position sensor 10 is also installed on arm cylinder 4e.

Boom cylinder 4f includes a cylinder tube 4X, and a cylinder rod 4Y movable relative to cylinder tube 4X within cylinder tube 4X. In cylinder tube 4X, a piston 4V is slidably provided. Cylinder rod 4Y is installed on piston 4V. Cylinder rod 4Y is slidably provided on a cylinder head 4W. A chamber defined by cylinder head 4W, piston 4V, and the cylinder inner wall forms a cylinder-head-side oil chamber 40H. An oil chamber opposite to cylinder-head-side oil chamber 40H with piston 4V being interposed therebetween forms a cylinder-bottom-side oil chamber 40B. It should be noted that cylinder head 4W is provided with a seal member so as to seal a space between cylinder head 4W and cylinder rod 4Y and prevent penetration of dust or the like into cylinder-head-side oil chamber 40H.

When the hydraulic oil is supplied to cylinder-head-side oil chamber 40H and the hydraulic oil is discharged from cylinder-bottom-side oil chamber 40B, cylinder rod 4Y is retracted. On the other hand, when the hydraulic oil is discharged from cylinder-head-side oil chamber 40H and the hydraulic oil is supplied to cylinder-bottom-side oil chamber 40B, cylinder rod 4Y is extended. In other words, cylinder rod 4Y is moved linearly in the leftward/rightward direction in the figure.

A case 14 is provided external to cylinder-head-side oil chamber 204H in close proximity to cylinder head 4W so as to cover position sensor 10 and contain position sensor 10 therein. Case 14 is fastened to cylinder head 4W by a bolt or the like and is fixed to cylinder head 4W.

Position sensor 10 has a rotary roller 11, a rotation center shaft 12, and a rotation sensor unit 13. Rotary roller 11 has a surface in contact with the surface of cylinder rod 4Y, and is provided to be rotatable according to the linear motion of cylinder rod 4Y. In other words, rotary roller 11 converts the linear motion of cylinder rod 4Y into rotational motion. Rotation center shaft 12 is disposed orthogonal to the direction of linear motion of cylinder rod 4Y.

Rotation sensor unit 13 is configured to be capable of detecting an amount of rotation of rotary roller 11 (angle of rotation). A signal indicating the amount of rotation (angle of rotation) of rotary roller 11 as detected by rotation sensor unit 13 is sent to measurement controller 30 via the electric signal line. Measurement controller 30 converts it to a position (stroke position) of cylinder rod 4Y of boom cylinder 4f.

Rotation sensor unit 13 has a magnet 13a and a hall IC 13b. Magnet 13a, which is a medium for detection, is installed on rotary roller 11 such that magnet 13a is rotated together with rotary roller 11. Magnet 13a is rotated according to rotation of rotary roller 11 about rotation center shaft 12. Magnet 13a is configured such that the N pole and S pole are alternately changed according to the angle of rotation of rotary roller 11. Magnet 13a is configured such that magnetic force (flux density) detected by hall IC 13b is changed periodically, assuming that one rotation of rotary roller 11 is one period.

Hall IC 13b is a magnetic force sensor that detects, as an electric signal, the magnetic force (flux density) generated by magnet 13a. Hall IC 13b is provided away from magnet 13a by a predetermined distance in the axial direction of rotation center shaft 12.

The electric signal detected by hall IC 13b is sent to measurement controller 30, and is converted by measurement controller 30 into an amount of rotation of rotary roller 11, i.e., an amount of displacement (stroke length) of cylinder rod 4Y of boom cylinder 4f. Specifically, an amount of linear displacement of cylinder rod 4Y for one rotation of rotary roller 11 is calculated to be 2πd using a radius of rotation d of rotary roller 11.

Referring to FIG. 5 mainly, the following describes a relation between an angle of rotation of rotary roller 11 and an electric signal (voltage) detected by hall IC 13b. When rotary roller 11 is rotated and accordingly magnet 13a is rotated, magnetic force (flux density) passing through hall IC 13b is periodically changed according to the angle of rotation, thereby periodically changing the electric signal (voltage) output from the sensor. Based on a magnitude of the voltage thus output from hall IC 13b, the angle of rotation of rotary roller 11 can be measured.

Further, the rotation speed of rotary roller 11 can be measured by counting the number of repetitions of one period for the electric signal (voltage) output from hall IC 13b. Based on the angle of rotation of rotary roller 11 and the rotation speed of rotary roller 11, the amount of displacement (stroke length) of cylinder rod 4Y of boom cylinder 4f is measured.

Figure 6:
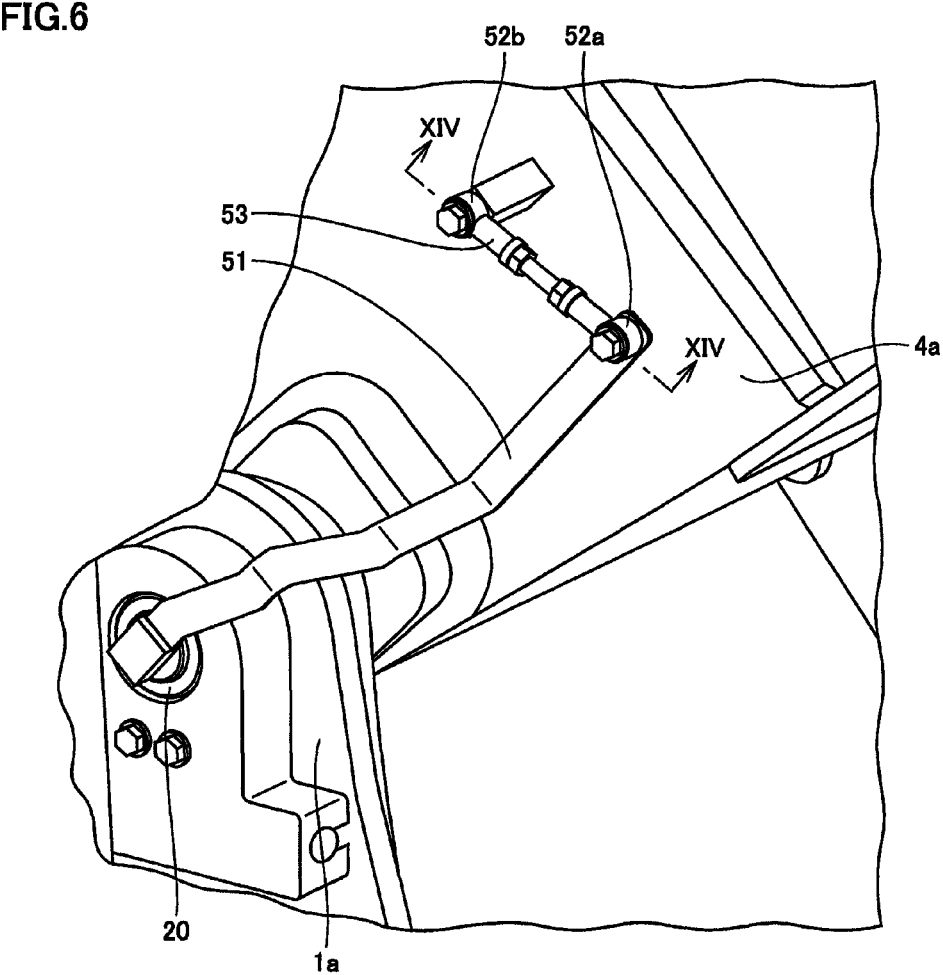
FIG. 6 is a perspective view schematically showing a configuration of the rotary encoder of the hydraulic excavator in one embodiment of the present invention.
Figure 7:
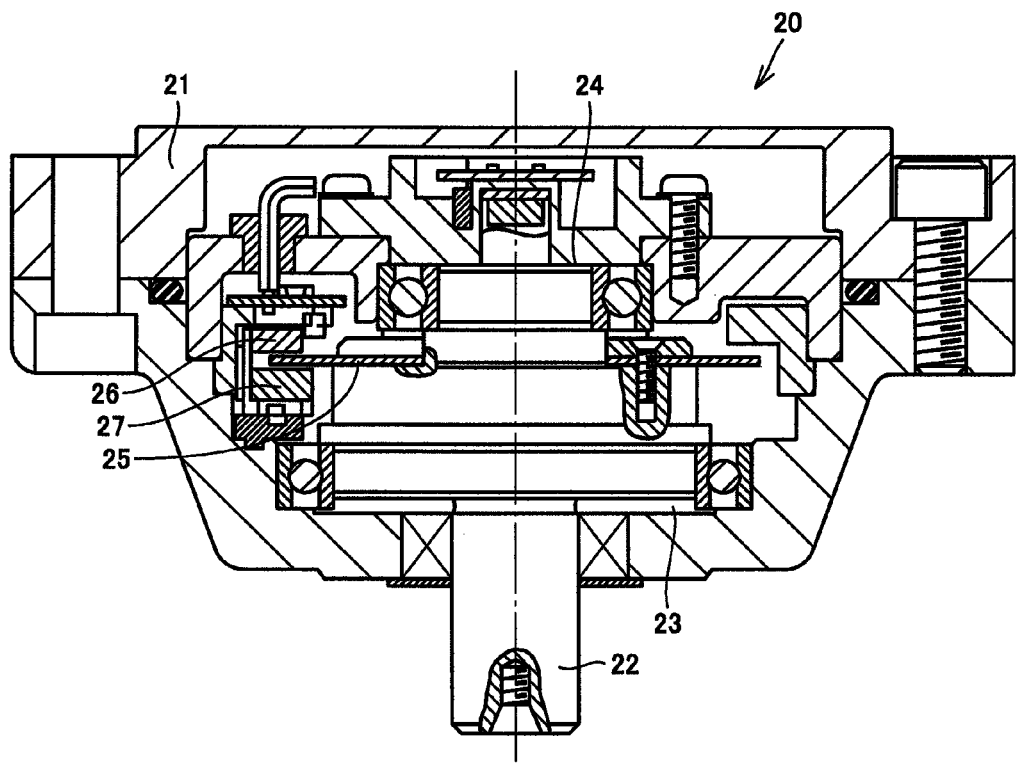
FIG. 7 is a cross sectional view schematically showing the configuration of the rotary encoder of the hydraulic excavator in one embodiment of the present invention.
Figure 8:
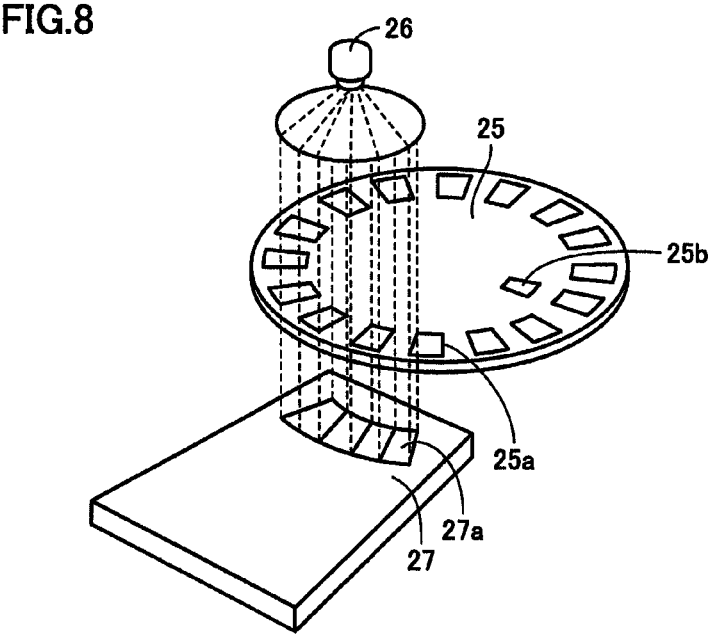
FIG. 8 is a perspective view schematically showing a relation among a light emitting unit, a light receiving unit, and a disk unit of the rotary encoder of the hydraulic excavator in one embodiment of the present invention.

Referring to FIG. 6 to FIG. 8, rotary encoder 20 will be described. For ease of description, the following describes rotary encoder 20 that is installed on vehicle main body 1a serving as a base body portion and that is connected to boom 4a serving as a movable portion, but rotary encoder 20 is also installed on boom 4a serving as a base body portion is connected to arm 4b serving as a movable portion as shown in FIG. 1. The movable portion is supported to be revolvable relative to the base body portion. Further, the hydraulic cylinder supports the movable portion such that the movable portion is revolvable relative to the base body portion.

Rotary encoder 20 is installed on vehicle main body 1a serving as the base body portion. Rotary encoder 20 is connected to boom 4a serving as the movable portion, via a first lever 51, first and second ball joints 52a, 52b, and a second lever 53. Rotary encoder 20 is not connected to boom cylinder 4f, and is therefore unlikely to be influenced by oil temperature increase of the hydraulic oil during work. It should be noted that first lever 51, first and second ball joints 52a, 52b, and second lever 53 will be described later.

Referring to FIG. 7 and FIG. 8 mainly, rotary encoder 20 includes a housing 21, a rotation shaft 22, bearings 23, 24, a disk unit 25, a light emitting unit 26, and a light receiving unit 27. Housing 1 contains: bearings 23, 24 rotatably supporting rotation shaft 22; disk unit 25; light emitting unit 26; and light receiving unit 27. Rotation shaft 22 has one end supported by bearings 23, 24, and has the other end connected to lever 51. In housing 21, disk unit 25 is connected to rotation shaft 22 such that disk unit 25 is rotated together with rotation shaft 22, and light emitting unit 26 and light receiving unit 27 are disposed to interpose disk unit 25 therebetween.

Light emitting unit 26 has a light emitting element that emits light to light receiving unit 27. Light receiving unit 27 has four light receiving elements 27a capable of receiving the light emitted from light emitting unit 26. Four light receiving elements 27a have the same width W, and are disposed one after another in series in the form of an arc. Each of light receiving elements 27a converts an amount of received light into an electric signal. Disk unit 25 is provided with a plurality of first transmission portions 25a through which the light emitted from light emitting unit 26 passes to light receiving unit 27. Each of first transmission portions 25a is a substantially rectangular slit having a circumferential width of 2 W and extending radially. First transmission portions 25a are disposed at an interval of 2 W in the vicinity of the outer circumference of disk unit 25 in the form of a circle parallel to the outer circumference. The circle thus formed by first transmission portions 25a has an inner circumference in which a single transmission portion 25b is disposed. Transmission portion 25b is a substantially rectangular slit extending radially.

Disk unit 25 is revolved by first and second levers 51, 53 in synchronization with revolution of boom 4a relative to vehicle main body 1a. Four light receiving elements 27a output electric signals corresponding to amounts of light having passed through first and second transmission portions 25a, 25b as a result of the rotation of disk unit 25. Light receiving unit 27 receives electric signals from the separated first and third ones of light receiving elements 27a disposed in series and receives electric signals from the separated second and fourth ones of light receiving elements 27a, converts them into pulse signals corresponding to the number of first transmission portions 25a through which the light has passed, and sends them to measurement controller 30. For generation of one pulse signal, electric signals from two light receiving elements 27a are used in order to improve robustness of the sensor with respect to external light or the like.

Further, when light receiving element 27a outputs an electric signal corresponding to the light having passed through transmission portion 25b, light receiving unit 27 outputs a corresponding pulse signal. In other words, light receiving unit 27 outputs three pulse signals generated according to an angle of revolution of disk unit 25. The angle of revolution of disk unit 25 is the same as that of boom 4a, so that the pulse signals are output according to the angle of revolution of boom cylinder 4f.

Specifically, rotary encoder 20 is of an incremental type, and is configured to be capable of outputting a pulse signal having A phase, a pulse signal having B phase different from the A phase by 90° in phase, and a pulse signal (reference pulse signal) having Z phase and generated for every one rotation of disk unit 25. Measurement controller 30 counts the number of pulses of the pulse signal having A phase. The number of counts is in proportion to an amount of revolution of boom cylinder 4f. Measurement controller 30 determines a direction of rotation of boom 4a based on a difference in phase between the A phase and the B phase. The pulse signal having Z phase is used to measure a reference position for the rotation of boom 4a. The reference position is set substantially in the middle of a revolvable angle range of boom 4a. The reference position thus set is stored in measurement controller 30. The pulse signal having Z phase is output when the emitted light passing through transmission portion 25a corresponding to the Z phase is blocked by disk unit 25. In other words, the pulse signal having Z phase is detected upon falling of the pulse signal.

Rotary encoder 20 outputs the pulse signal having Z phase at an angle substantially in the middle of the revolvable range of boom 4a. In other words, rotary encoder 20 outputs the pulse signal having Z phase substantially in the middle of the stroke range of boom cylinder 4f. In the present embodiment, the reference position of encoder 20 is set as described above, but the reference position may be set at any position other than a stroke end of the hydraulic cylinder. More specifically, rotary encoder 20 may output the pulse signal having Z phase at a reference position corresponding to a revolvable angle of boom 4a, the reference position being within a range from a side of one end of cylinder rod 4Y relative to the extension-side stroke end position of cylinder rod 4Y to a side of the other end of cylinder rod 4Y relative to the retraction-side stroke end position of cylinder rod 4Y, the one end being external to cylinder tube 4X, the other end being within cylinder tube 4X.

Next, a process performed by the measurement controller will be described.

Figure 9:
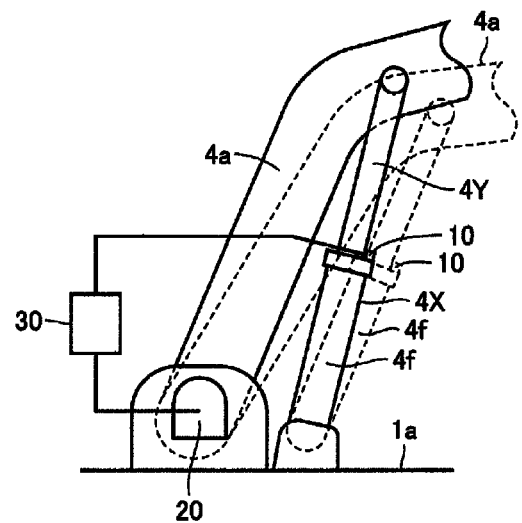
FIG. 9 is a side view schematically showing how a boom of the hydraulic excavator is moved up/down in one embodiment of the present invention.
Figure 10:
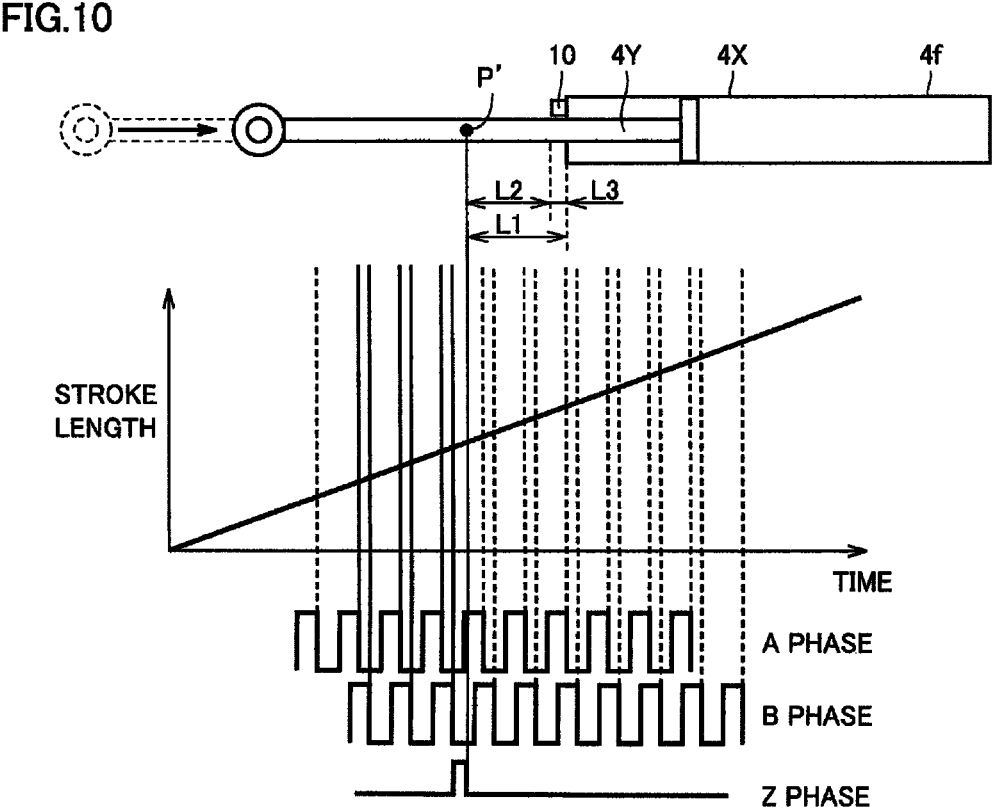
FIG. 10 schematically shows a process of correcting deviation of a stroke length of the hydraulic cylinder of the hydraulic excavator in one embodiment of the present invention.

Referring to FIG. 9 and FIG. 10, the following illustrates a case where boom 4a is moved up/down. When boom cylinder 4f is extended/retracted, boom 4a is moved up/down. When boom 4a is moved up to the highest position, boom cylinder 4f reaches the extension-side stroke end. When boom 4a is moved down to the lowest position, boom cylinder 4f reaches the retraction-side stroke end. On this occasion, the stroke length of boom cylinder 4f is measured as the amount of rotation of rotary roller 11 by position sensor 10.

Between rotary roller 11 of position sensor 10 (see FIG. 4) and cylinder rod 4Y, slight slippage (slip) inevitably takes place to result in an error (accumulated error due to the slippage) between the actual position of cylinder rod 4Y and the measured position thereof obtained from the result of detection of position sensor 10. Accordingly, in order to calibrate the stroke measurement value obtained from the result of detection of position sensor 10, rotary encoder 20 is provided as a reset sensor. Rotary roller 11 and rotary encoder 20 are connected to measurement controller 30. Measurement controller 30 calibrates the stroke length measured by position sensor 10, based on the pulse signals output from rotary encoder 20.

Referring to FIG. 10 mainly, the following describes the measurement of stroke length including the calibration thereof.

When boom cylinder 4f is extended, boom 4a is moved up. The stroke length of boom cylinder 4f on this occasion is measured by position sensor 10. Meanwhile, in response to boom 4a being moved up, boom 4a is revolved relative to vehicle main body 1a to rotate disk unit 25 in rotary encoder 20. On this occasion, the light emitted from light emitting unit 26 passes through transmission portions 25a, 25b of disk unit 25 and is received by light receiving unit 27, whereby light receiving unit 27 outputs pulse signals corresponding to the angle of rotation of disk unit 25. Output from light receiving unit 27 are the pulse signals respectively having A phase, B phase, and Z phase. The pulse signal having Z phase is associated with a reference angle, which is a predetermined angle of revolution of boom 4a, and is output when boom 4a comes to the position of the reference angle.

Measurement controller 30 stores, as a stored reference position P, the stroke length of boom cylinder 4f attained when boom 4a is in such a posture that rotary encoder 20 outputs the pulse signal having Z phase. Stored reference position P is calibrated during initial calibration described below, and is then stored as calibrated reference position P'.

In the operation of boom cylinder 4f after detecting the pulse signal having Z phase, a shortened stroke length L1, which corresponds to a predetermined integer number of pulses of the pulse signal having A phase, of boom cylinder 4f is detected. Length L1 is detected by position sensor 10.

Measurement controller 30 has a reference stroke length L2 stored therein. Reference stroke length L2 corresponds to an predetermined integer number of pulses of the pulse signal having A phase, and is calculated and stored therein as a result of the below-described initial calibration. Measurement controller 30 calculates a difference L3 between measured stroke length L1 and reference stroke length L2.

In accordance with difference L3, measurement controller 30 calibrates the measurement value of position sensor 10 when the pulse signal having Z phase is detected and boom cylinder 4f becomes non-operational after the operation.

In other words, the stroke length of boom cylinder 4f is measured until revolution of a predetermined angle from the reference angle of revolution is detected after it is detected that boom 4a serving as the work implement reaches the reference angle of revolution. The stroke length thus measured is compared with the reference stroke length stored in advance, having been through the below-described initial calibration, and measured in the same procedure, thereby calculating deviation therebetween. When boom 4a becomes non-operational, the deviation is reflected in the measurement value.

The following describes the initial calibration for measurement of stroke of the hydraulic cylinder of the hydraulic excavator. In the initial calibration, data to be used as a reference for the calibration for measurement of stroke is obtained. The initial calibration is performed before work using hydraulic excavator 1.

Figure 11:
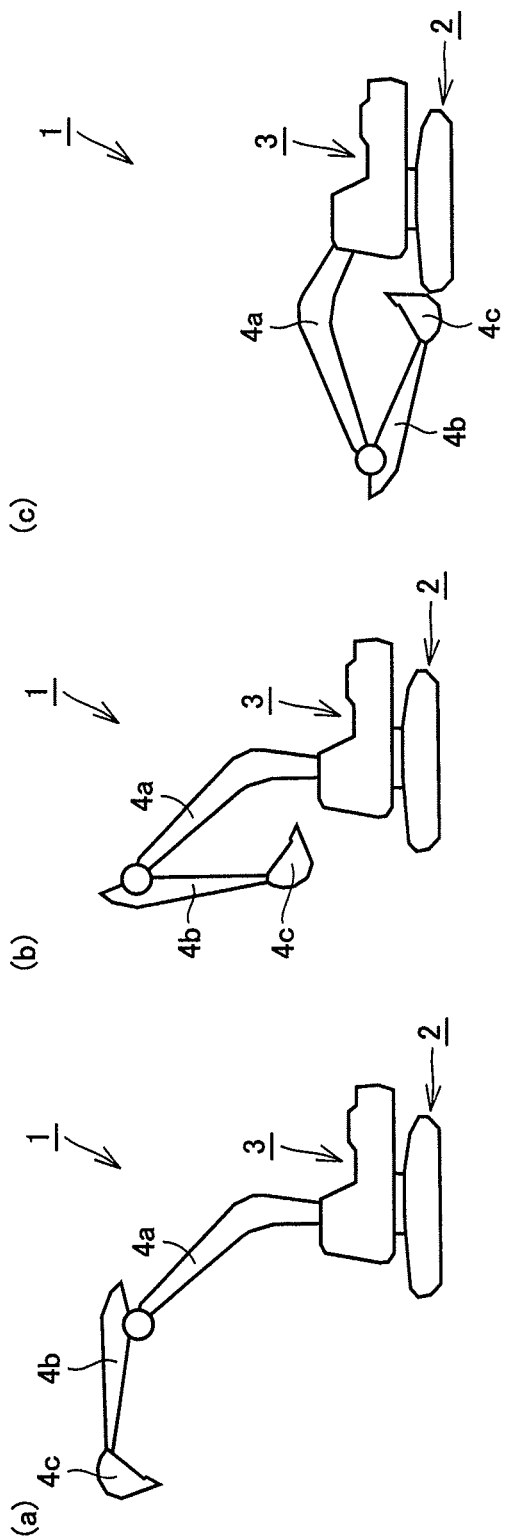
FIG. 11 is a side view schematically showing an operation of the hydraulic excavator in a calibration mode in one embodiment of the present invention.
Figure 12:
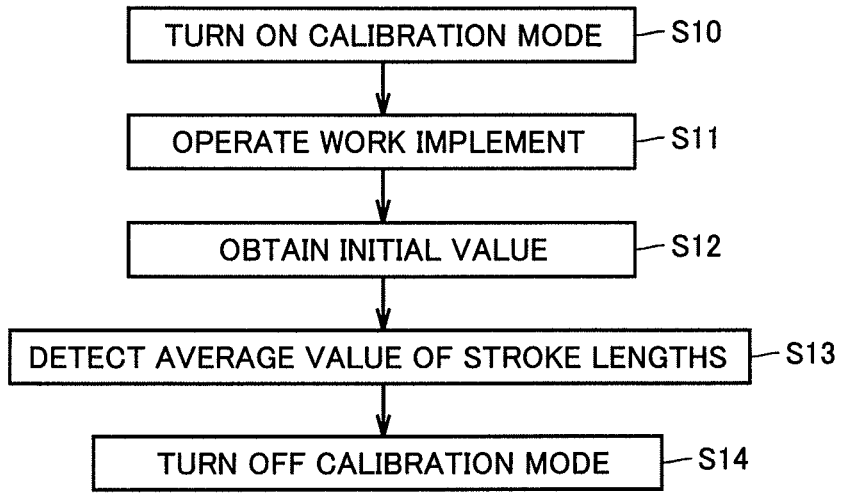
FIG. 12 is a flowchart schematically showing the calibration mode in a method for correcting the stroke of the hydraulic cylinder of the hydraulic excavator in one embodiment of the present invention.

First, referring to FIG. 11 and FIG. 12, calibration of the reference position (base position) will be described. As described above, reference position P for stroke of boom cylinder 4f is stored in advance which corresponds to such a posture of boom 4a that the pulse signal having Z phase is output. For more precise correspondence between this stored reference position and the output of the Z phase pulse signal, calibration is performed before the work.

Referring to FIG. 11(a), a calibration mode is turned on with such a posture (work implement initial posture) that arm 4b of hydraulic excavator 1 is extended and boom 4a is at the highest position (S10). In this posture, cylinder rod 4Y of boom cylinder 4f is disposed at the extension-side stroke end. The cylinder rod of arm cylinder 4e is disposed at the retraction-side stroke end.

Next, referring to FIG. 11(b), the work implement is operated (S11) to bend arm 4b. In doing so, arm cylinder 4e shown in FIG. 3 is bent at a constant speed slower than a speed for a normal operation. While bending arm 4b (i.e., while extending arm cylinder 4e), the pulse signal having Z phase is output at an angle of revolution substantially in the middle of the movable range of arm 4b. In accordance with the output of rotary encoder 20, measurement controller 30 calculates a stroke of arm cylinder 4e from the extension-side stroke end to the position at which the pulse signal having Z phase is output, and stores a corresponding stroke thereof from the retraction-side stroke end as a calibration reference position P'. In other words, calibration reference position P' of the stroke is set in accordance with the number of pulses of the pulse signal corresponding to the angle of revolution of arm 4b (S12).

The following describes obtainment of reference stroke length L2. After the output of the pulse signal having Z phase, arm cylinder 4e keeps on operating to extend further in the extension direction. Whenever 10 pulses of the pulse signal having A phase are counted, an electric signal of position sensor 10 is stored in measurement controller 30. In a similar way, 15 electric signals are stored in total. Based on the 15 electric signals, stroke lengths are calculated and an average value thereof is calculated. In this way, the average value of the stroke lengths of arm cylinder 4e in the calibration mode is detected (S13). As described above, measurement controller 30 causes position sensor 10 to measure the stroke length corresponding to the 10 pulses of the pulse signal having A phase, and stores it as reference stroke length L2.

Further, referring to FIG. 11(c), the work implement is operated (S11) to move down boom 4a. In doing so, boom cylinder 4f shown in FIG. 10 is retracted at a constant speed slower than a speed for a normal operation. While moving down boom 4a (i.e., when retracting boom cylinder 4f), the pulse signal having Z phase is output at an angle of revolution substantially in the middle of the movable range of boom 4a. Measurement controller 30 causes position sensor 10 to measure the stroke of boom cylinder 4f from the retraction-side stroke end to the position at which the pulse signal having Z phase is output, and stores the stroke as calibration reference position L2. In this way, the calibration reference position, which is an initial value for calibration, is obtained (S12). Whenever 10 pulses of the pulse signal having A phase are counted after the output of the pulse signal having Z phase, an electric signal of position sensor 10 are stored in measurement controller 30. In a similar way, 15 electric signals are stored in total. Based on the 15 electric signals, stroke lengths are calculated and an average value thereof is calculated. In this way, the average value of the stroke lengths of boom cylinder 4f in the calibration mode is detected (S13). As described above, measurement controller 30 causes position sensor 10 to measure the stroke length corresponding to the 10 pulses of the pulse signal having A phase and sent from rotary encoder 20, and stores it as reference stroke length L2. Thereafter, the calibration mode is turned off (S14).

The calibration of the reference position for the measurement of stroke of boom cylinder 4f is performed in the direction of retraction of the cylinder due to the following reason. That is, the retraction-side stroke end of boom cylinder 4f cannot be normally used because the work implement is disposed downwardly of the ground level when boom cylinder 4f is retracted to the retraction-side stroke end.

Figure 13:
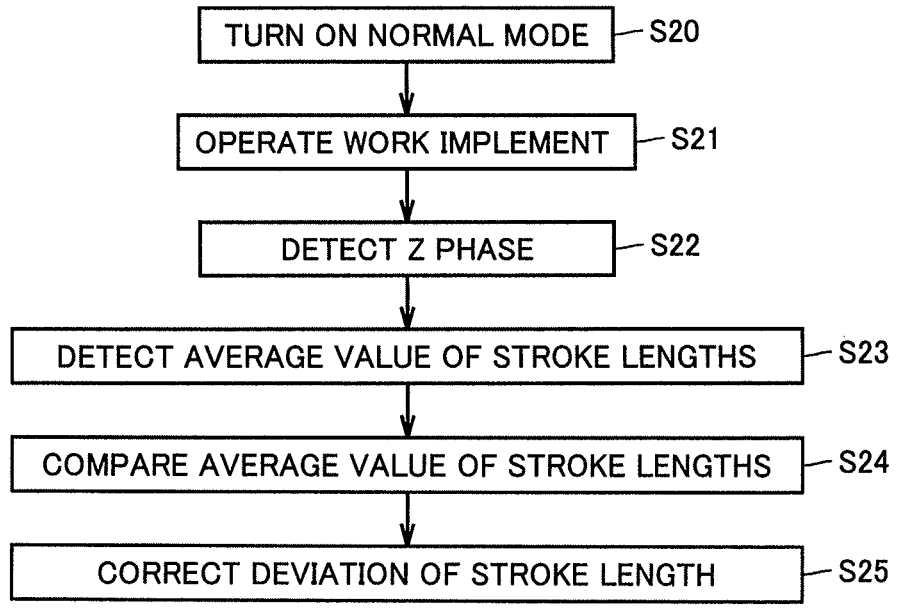
FIG. 13 is a flowchart schematically showing a normal mode in the method for correcting the stroke of the hydraulic cylinder of the hydraulic excavator in one embodiment of the present invention.

Referring to FIG. 13, the following fully describes measurement, particularly calibration, of stroke during a normal operation. First, a normal mode is turned on (S20). Thereafter, the work implement is operated (S21). When the angle of revolution of arm cylinder 4e reaches the reference angle during the operation, rotary encoder 20 outputs the pulse signal having Z phase (S22). When arm 4b is further revolved to exceed the reference angle (arm cylinder 4e is further extended), an electric signal of position sensor 10 is stored in measurement controller 30 whenever 10 pulses of the pulse signal having A phase are counted after the output of the pulse signal having Z phase from rotary encoder 20. In a similar way, 15 electric signals are stored in total. Based on the 15 electric signals, stroke lengths are calculated and an average value thereof is calculated. In this way, the average value of the stroke lengths of arm cylinder 4e for every 10 pulses of the pulse signal is detected (S23).

Further, the work implement is operated (S11) to move down boom 4a. In doing so, boom cylinder 4a shown in FIG. 10 is retracted at a speed faster than the speed for normal operation. When the angle of revolution of boom 4a reaches the reference angle, rotary encoder 20 outputs the pulse signal having Z phase (S22). The stroke length after exceeding the reference angle is measured by position sensor 10. Whenever 10 pulses of the pulse signal having A phase are counted after the output of the pulse signal having Z phase from rotary encoder 20, an electric signal of position sensor 10 is stored in measurement controller 30. In a similar way, 15 electric signals are stored in total. Based on the 15 electric signals, stroke lengths are calculated and an average value thereof is calculated. In this way, the average value of the stroke lengths of boom cylinder 4f in the normal mode for every 10 pulses of the pulse signal is detected (S23).

Then, a comparison is made between the average value of the stroke lengths of arm cylinder 4e in the calibration mode (reference stroke length L2) and the average value of the stroke lengths of arm cylinder 4e in the normal mode (S24). Based on the average value of the stroke lengths of arm cylinder 4e in the calibration mode, the average value of the stroke lengths of arm cylinder 4e in the normal mode is corrected, thereby correcting deviation of the stroke length in the normal mode (S25). This deviation of the stroke length is corrected in a state in which the hydraulic cylinders (arm cylinder 4e and boom cylinder 4f) are non-operational. The state in which the hydraulic cylinders are non-operational is intended to mean a state in which the work implement is not moved.

It should be noted that in the above-described embodiment, the deviation of the stroke length is corrected by moving cylinder rod 4Y relative to cylinder tube 4X in the same direction as the direction in which cylinder rod 4Y is moved relative to cylinder tube 4X during the setting of initial value. In other words, the deviation of the stroke length is corrected with the direction of motion of arm cylinder 4e and boom cylinder 4f in the calibration mode being the same as the direction of motion of arm cylinder 4e and boom cylinder 4f in the normal mode.

Figure 14:
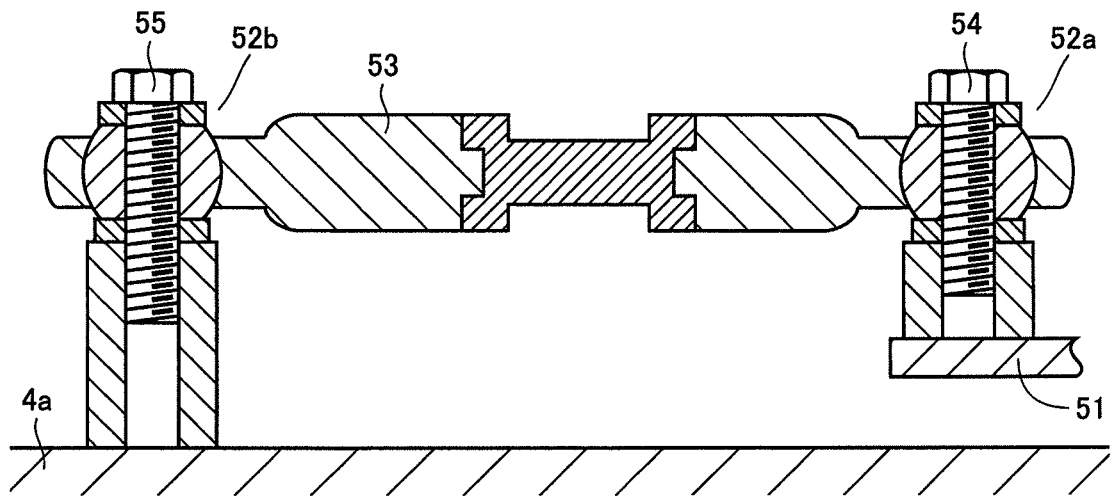
FIG. 14 is a schematic cross sectional view taken along a line XIV-XIV in FIG. 6.

Referring to FIG. 6 and FIG. 14, the following describes first lever 51, first and second ball joints 52a, 52b, and second lever 53. First lever 51 is configured to transmit the revolution of boom 4a to rotary encoder 20. First lever 51 extends in a direction orthogonal to rotation shaft 22 (see FIG. 7). First lever 51 has one end connected to rotation shaft 22 of rotary encoder 20 installed on vehicle main body 1a. First lever 51 has the other end revolvably connected to one end of second lever 53 via first ball joint 52a. First ball joint 52a is fixed to first lever 51 by a bolt 54.

Second lever 53 has one end connected to first lever 51 via first ball joint 52a, and has the other end connected to boom 4a via second ball joint 52b. Second lever 53 extends along boom 4a. Second ball joint 52b is revolvably installed on second lever 53, and is installed on boom 4a. Second ball joint 52b is fixed to boom 4a by a bolt 55.

With the above-described structure, rotation shaft 22 of rotary encoder 20 is rotated by the same amount as the amount of revolution of boom 4a relative to vehicle main body 1a. Further, when rotary encoder 20 and boom 4a are connected to each other not by one lever but by two levers connected to each other via one ball joint as described above, propagation of load and vibrations from boom 4a to encoder 20 can be reduced. The reduced load and vibrations lead to prevention of breakage of rotary encoder 20, thus resulting in improved precision in measurement.

Figure 15:
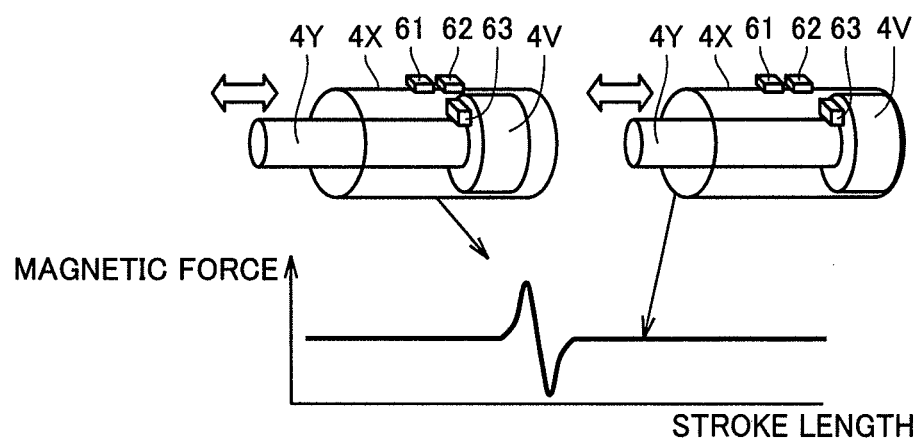
FIG. 15 schematically shows a magnetic force sensor installed on a bucket cylinder of the hydraulic excavator in one embodiment of the present invention.

Referring to FIG. 3 and FIG. 15, the following describes magnetic force sensor 20a provided in bucket cylinder 4d.

As described above, between rotary roller 11 of position sensor 10 and cylinder rod 4Y, slight slippage (slip) inevitably takes place to result in an error (accumulated error due to the slippage) between the actual position of cylinder rod 4Y and the measured position thereof obtained from the result of detection of position sensor 10. Required precision in detecting a stroke length of bucket cylinder 4d is not as high as the precision for each of boom cylinder 4f and arm cylinder 4e. Accordingly, magnetic force sensor 20a is installed on bucket cylinder 4d as a reset sensor in order to reset, to the reference position (base position), the stroke position obtained from the result of detection of position sensor 10.

Magnetic force sensor 20a is installed on an external portion of cylinder tube 4X. Magnetic force sensor 20a has two magnetic force sensors 61, 62 disposed to be separated from each other by a predetermined distance in the direction of linear motion of piston 4V. Magnetic force sensors 61, 62 are provided on the known reference position (base position). Piston 4V is provided with a magnet 63 to generate lines of magnetic force. Each of magnetic force sensors 61, 62 permits passage of lines of magnetic force generated by magnet 63, detects magnetic force (flux density), and outputs an electric signal (voltage) corresponding to the magnetic force (flux density). The signals detected by magnetic force sensors 61, 62 are sent to measurement controller 30. Based on the results of detection of magnetic force sensors 61, 62, measurement controller 30 then performs a process of resetting, to the reference position (base position), the stroke position obtained from the result of detection of position sensor 10.

Operation controller 30a can transmit/receive information to/from a communication satellite 43 via a communication terminal 41 and antenna 9. Location information regarding the horizontal and vertical positions of the edge of blade of work implement 4 and detected based on the information received from communication satellite 43 via communication terminal 41 and antenna 9 is transmitted to operation controller 30a and measurement controller 30, whereby the edge of blade of work implement 4 can be automatically controlled based on the location information.

The following describes function and effect of the present embodiment.

According to hydraulic excavator 1 of one embodiment of the present invention, measurement controller 30 corrects the deviation of the stroke length measured by position sensor 10, based on the pulse signal output from rotary encoder 20. The pulse signal can be detected precisely, so that the stroke length can be measured precisely by correcting the deviation of the stroke length, measured by position sensor 10, based on the pulse signal output from rotary encoder 20.

In hydraulic excavator 1 described above, rotary encoder 20 is installed on vehicle main body 1a or the like so as not to be influenced by the temperature of the hydraulic oil. Assuming that the pulse signal output from rotary encoder 20 and corresponding to the amount of revolution of the work implement is a reference, the measurement value by position sensor 10 is calibrated. In this way, the deviation of the stroke length can be precisely corrected during work, whereby the stroke length can be precisely measured.

In hydraulic excavator 1, rotary encoder 20 outputs the reference pulse signal at a reference position other than a stroke end of the hydraulic cylinder. In the hydraulic excavator, the hydraulic cylinder is less likely to reach the stroke end of the hydraulic cylinder during work. Hence, with the reference position being a position other than the stroke end of the hydraulic cylinder, the stroke length can be precisely measured during work.

In hydraulic excavator 1, rotary encoder 20 may output the pulse signal having Z phase at a reference position within a range from a side of one end of cylinder rod 4Y relative to the extension-side stroke end of cylinder rod 4Y to a side of the other end of cylinder rod 4Y relative to the retraction-side stroke end position of cylinder rod 4Y, the one end being external to cylinder tube 4X, the other end being within cylinder tube 4X. With the reference position being in the range, the stroke length can be measured precisely during work.

In hydraulic excavator 1, the deviation of the stroke length can be corrected in comparison between the reference stroke length and the stroke length measured by position sensor 10. Both the reference stroke length and the stroke length measured by position sensor 10 correspond to the same integer number of pulses of the pulse signal having A phase. The use of the integer number of pulses of the pulse signal having A phase leads to suppression of influence of an error between the reference stroke length and the measured stroke length per pulse of the pulse signal having A phase.

In hydraulic excavator 1, the direction of revolution of disk unit 25 during measurement of the reference stroke length is the same as the direction of revolution of disk unit 25 during measurement of the stroke length. This eliminates an error otherwise taking place due to a difference in direction of revolution of disk unit 25. Hence, the correction can be performed more precisely.

In hydraulic excavator 1, the revolution of work implement 4 is propagated to rotary encoder 20 via first lever 51 and second lever 53 connected to each other via first ball joint 52a. Rotary encoder 20 measures an amount of revolution thereof. In this way, the load and vibrations from work implement 4 are not directly propagated to rotary encoder 20. Hence, the amount of revolution can be measured precisely and rotary encoder 20 can be provided with longer life.

The method for measuring the stroke of the hydraulic cylinder of the hydraulic excavator in one embodiment of the present invention includes the following steps. The stroke length of the hydraulic cylinder supporting the movable portion, which is formed of one of boom 4a and arm 4b, such that the movable portion is revolvable relative to the base body portion formed of one of vehicle main body 1a and boom 4a is measured by position sensor 10 as an amount of rotation. The pulse signal is formed and output by the light receiving unit from rotary encoder 20 based on light emitted from light emitting unit 26 and having passed through the plurality of transmission portions 25a to light receiving unit 27, the pulse signal being generated according to an angle of revolution of disk unit 25 that is revolved in synchronization with revolution of the movable portion relative to the base body portion, the angle of revolution being associated with the stroke length of work implement 4. The deviation of the stroke length, which is measured by position sensor 10, is corrected by control unit 30 based on the pulse signal output from rotary encoder 20. The pulse signal can be detected precisely, so that the deviation of the stroke length measured by position sensor 10 can be corrected precisely and the stroke length of the hydraulic cylinder can be measured by correcting the deviation of stroke length based on the pulse signal output from rotary encoder 20.

In the method for measuring the stroke of the hydraulic cylinder of the hydraulic excavator in one embodiment, the deviation of the stroke length is corrected when the hydraulic cylinder is non-operational. By correcting the deviation of the stroke length while the hydraulic cylinder is non-operational, the stroke length can be measured precisely.

In the method for measuring the stroke of the hydraulic cylinder of the hydraulic excavator in one embodiment, in accordance with the reference stroke length corresponding to the integer number of pulses of the pulse signal from the reference position, the deviation of the stroke length measured by position sensor 10 and corresponding to the integer number of pulses of the pulse signal is corrected. In this way, calibration can be performed always at the same stroke position. As a result, precision in calibration, i.e., precision in measurement is improved.

In the method for measuring the stroke of the hydraulic cylinder of the hydraulic excavator in one embodiment, the deviation of the stroke length is corrected with cylinder rod 4Y being moved relative to cylinder tube 4X in the same direction. Accordingly, the deviation of the stroke length due to slippage of position sensor 10 can be eliminated. The slippage takes place when the directions of motion of cylinder rod 4Y relative to cylinder tube 4X differ.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: hydraulic excavator; 1a: vehicle main body; 2: lower carrier; 2a: crawler belt; 3: upper revolving unit; 3a: engine;

3b: swing motor; 4: work implement; 4a: boom; 4b: arm; 4c: bucket; 4d: bucket cylinder; 4e: arm cylinder; 4f: boom cylinder; 4V: piston; 4W: cylinder head; 4X: cylinder tube; 4Y: cylinder rod; 5: cab; 6: engine compartment; 7: counter weight; 8: operator's seat; 9: antenna; 10: position sensor; 11: rotary roller; 12: rotation center shaft; 13: rotation sensor unit; 13a, 63: magnet; 14: case; 20: rotary encoder; 20a, 61: magnetic force sensor; 21: housing; 22: rotation shaft; 23: bearing; 25: disk unit; 25a: transmission portion; 26: light emitting unit; 27: light receiving unit; 30: measurement controller (control unit); 30a: operation controller; 40B: cylinder-bottom-side oil chamber; 40H: cylinder-head-side oil chamber; 51: first lever; 52a: first ball joint; 52b: second ball joint; 53: second lever; 101: operation lever device; 101a: operation lever; 101b: detecting unit; 102: control valve; 103: hydraulic pump; 103a: swash plate; 104: servo mechanism; 105: engine driving mechanism; 106: discharging oil path; 107, 108: oil path; 109: battery; 110: ignition key switch.

The invention claimed is:

1. A hydraulic excavator comprising:
 a base body portion formed of one of a vehicle main body and a boom;
 a movable portion supported to be revolvable relative to said base body portion;
 a hydraulic cylinder supporting said movable portion such that said movable portion is revolvable relative to said base body portion;
 a position sensor installed on said hydraulic cylinder to measure a stroke length of said hydraulic cylinder;
 a rotary encoder installed across said base body portion and said movable portion, said rotary encoder including a light emitting unit, a light receiving unit capable of receiving light emitted from said light emitting unit, and a disk unit having a plurality of transmission portions that permit passage of the light emitted from said light emitting unit to said light receiving unit, said disk unit being revolved in synchronization with revolution of said movable portion relative to said base body portion, said light receiving unit outputting, based on the light having passed through said plurality of transmission portions, a pulse signal generated according to an angle of revolution of said disk unit, said angle of revolution of said disk unit being associated with an angle of revolution of said movable portion; and
 a control unit measuring the stroke length of said hydraulic cylinder by correcting deviation of the stroke length, which is measured by said position sensor, based on said pulse signal output from said rotary encoder.

2. The hydraulic excavator according to claim 1, wherein said pulse signal comprises a pulse signal having an A phase, a pulse signal having a B phase that is different from said pulse signal having an A phase by a 90° phase shift, and a pulse signal having a Z phase at a reference position other than a stroke end of said hydraulic cylinder.

3. The hydraulic excavator according to claim 2, wherein said hydraulic cylinder includes a cylinder tube, and a cylinder rod movable relative to said cylinder tube within said cylinder tube, and
 said rotary encoder outputs said pulse signal having a Z phase at said reference position within a range from a side of one end, which is external to said cylinder tube, of said cylinder rod relative to an extension-side stroke end position of said cylinder rod to a side of an other end, which is within said cylinder tube, of said cylinder rod relative to a retraction-side stroke end position of said cylinder rod.

4. The hydraulic excavator according to claim 2, wherein said control unit stores a reference stroke length corresponding to an integer number of pulses of said pulse signal having an A phase after outputting said pulse signal having a Z phase, and
 in accordance with said reference stroke length, said control unit corrects the deviation of the stroke length measured by said position sensor corresponding to the integer number of pulses of said pulse signal having an A phase.

5. The hydraulic excavator according to claim 4, wherein a direction of revolution of said disk unit during measurement of said reference stroke length is the same as a direction of revolution of said disk unit during measurement of said stroke length.

6. The hydraulic excavator according to claim 1, further comprising:
 a first lever connected to said rotary encoder installed on said base body portion;
 a second lever connected to said movable portion; and
 a ball joint revolvably connected to said first lever and said second lever.

7. A method for measuring a stroke of a hydraulic cylinder of a hydraulic excavator, comprising the steps of:
 measuring a stroke length of the hydraulic cylinder supporting a movable portion such that said movable portion is revolvable relative to a base body portion formed of one of a vehicle main body and a boom;
 outputting a signal associated with an angle of revolution of said movable portion relative to said base body portion; and
 measuring the stroke length of said hydraulic cylinder by correcting deviation of the measured stroke length based on said signal,
 the step of measuring the stroke length of said hydraulic cylinder including the step of measuring, by a rotation sensor, the stroke length of said hydraulic cylinder as an amount of rotation,
 the step of outputting said signal including the step of forming and outputting a pulse signal, which is generated according to an angle of revolution, associated with the stroke length of said hydraulic cylinder, of a disk unit that is provided with a plurality of transmission portions allowing light emitted from a light emitting unit to pass therethrough to a light receiving unit and that is revolved in synchronization with revolution of said movable portion relative to said base body portion, by said light receiving unit from a rotary encoder based on the light having passed through the plurality of transmission portions,
 the step of measuring the stroke length of said hydraulic cylinder including the step of correcting deviation of the stroke length, which is measured by said rotation sensor, by a control unit based on said pulse signal output from said rotary encoder.

8. The method for measuring the stroke of the hydraulic cylinder of the hydraulic excavator according to claim 7, wherein the step of correcting by said control unit includes the step of correcting the deviation of the stroke length, which is measured by said rotation sensor, based on said pulse signal output from said rotary encoder, while said hydraulic cylinder is non-operational.

9. The method for measuring the stroke of the hydraulic cylinder of the hydraulic excavator according to claim 7, wherein the step of correcting by said control unit includes the step of correcting, in accordance with a reference stroke length corresponding to an integer number of pulses of said pulse signal from a reference position, the deviation of the stroke length, which is measured by said position sensor and which corresponds to the integer number of pulses of said pulse signal.

10. The method for measuring the stroke of the hydraulic cylinder of the hydraulic excavator according to claim 9, wherein
   a direction of motion of a cylinder rod of said hydraulic cylinder relative to a cylinder tube during measurement of said reference stroke length is the same as a direction of motion of said cylinder rod of said hydraulic cylinder relative to said cylinder tube during measurement of said stroke length.

* * * * *